(12) United States Patent
Ren et al.

(10) Patent No.: US 10,997,090 B2
(45) Date of Patent: May 4, 2021

(54) ACCESSING INPUT/OUTPUT DEVICES OF DETACHABLE PERIPHERAL BY A MAIN COMPUTER

(71) Applicant: INTEL CORPORATION, Santa Clara, CA (US)

(72) Inventors: Guangyu Ren, Shanghai (CN); Kun-Feng Lin, Taipei (TW); Ke Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/303,484

(22) PCT Filed: Jun. 28, 2016

(86) PCT No.: PCT/CN2016/087386
§ 371 (c)(1),
(2) Date: Nov. 20, 2018

(87) PCT Pub. No.: WO2018/000164
PCT Pub. Date: Jan. 4, 2018

(65) Prior Publication Data
US 2019/0303306 A1    Oct. 3, 2019

(51) Int. Cl.
*G06F 13/10* (2006.01)
*G06F 13/42* (2006.01)
(Continued)

(52) U.S. Cl.
CPC ............ *G06F 13/102* (2013.01); *G06F 13/14* (2013.01); *G06F 13/385* (2013.01); *G06F 13/4282* (2013.01); *G06F 2213/0042* (2013.01)

(58) Field of Classification Search
CPC ...... G06F 13/102; G06F 13/14; G06F 13/385; G06F 13/4282; G06F 13/0042; G03G 2213/0042
(Continued)

(56) References Cited

U.S. PATENT DOCUMENTS 7,099,963 B2 * 8/2006 Byers .................. G06F 11/3034
710/260
2003/0182476 A1 * 9/2003 Kuo .......................... G06F 3/00
710/8
(Continued)

FOREIGN PATENT DOCUMENTS

| CN | 101581964 | 11/2009 |
| CN | 101983377 | 3/2011 |
| CN | 2018000164 | 1/2018 |

OTHER PUBLICATIONS

International Preliminary Report on Patentability for PCT Application No. PCT/CN2016/087386 filed on Jun. 28, 2016 dated Jan. 10, 2019, 7 pages.
(Continued)

*Primary Examiner* — Henry Tsai
*Assistant Examiner* — Aurangzeb Hassan
(74) *Attorney, Agent, or Firm* — Schiff Hardin LLP

(57) ABSTRACT

Techniques are disclosed for enabling an integrated sensor hub of a main computer to access a detachable peripheral device. In an embodiment, a system includes a main unit having a peripheral interface, an embedded controller, and a device controller. The peripheral interface is configured to be detachably coupled to a peripheral. The peripheral includes a control unit and an input/output device. The embedded controller is configured to communicate with the control unit of the peripheral via the peripheral interface while the peripheral is attached to the peripheral interface. The embedded controller includes at least one data register,
(Continued)

and in some embodiments, a set of data registers, configured to store data relating to the peripheral and to the corresponding input/output device. The device controller is configured to read data from the data register(s) of the embedded controller, write data to the data register(s) of the embedded controller, or both.

16 Claims, 5 Drawing Sheets

(51) Int. Cl.
  *G06F 13/38* (2006.01)
  *G06F 13/14* (2006.01)
(58) Field of Classification Search
  USPC .............................................................. 710/5
  See application file for complete search history.

(56) References Cited

U.S. PATENT DOCUMENTS

| | | | | |
|---|---|---|---|---|
| 2004/0039967 | A1* | 2/2004 | Park | G06F 11/1402 714/30 |
| 2004/0117565 | A1* | 6/2004 | Brant | G06F 13/404 711/154 |
| 2005/0015611 | A1 | 1/2005 | Poisner | |
| 2005/0198222 | A1* | 9/2005 | Kohinata | H04L 12/281 709/220 |
| 2007/0073953 | A1 | 3/2007 | Coffee et al. | |
| 2009/0292849 | A1* | 11/2009 | Khoo | G06F 13/385 710/301 |
| 2017/0286359 | A1* | 10/2017 | McGowan | G06F 13/4291 |
| 2018/0173666 | A1* | 6/2018 | Srivastava | G06F 13/36 |
| 2018/0189222 | A1* | 7/2018 | Srivastava | G06F 13/287 |
| 2018/0189224 | A1* | 7/2018 | Vadivelu | G06F 13/4022 |
| 2018/0296912 | A1* | 10/2018 | Hicks | A63F 13/213 |
| 2019/0041898 | A1* | 2/2019 | Harriman | G06F 1/14 |
| 2019/0042281 | A1* | 2/2019 | Raghav | G06F 9/44505 |
| 2019/0121647 | A1* | 4/2019 | Por | G06F 21/85 |
| 2019/0121764 | A1* | 4/2019 | Regupathy | G06F 13/362 |
| 2019/0303306 | A1* | 10/2019 | Ren | G06F 13/14 |

OTHER PUBLICATIONS

International Search Report and Written Opinion for PCT Application No. PCT/CN2016/087386 filed on Jun. 28, 2016, dated Apr. 5, 2017, 13 pages.

* cited by examiner

ACCESSING INPUT/OUTPUT DEVICES OF DETACHABLE PERIPHERAL BY A MAIN COMPUTER

BACKGROUND

Some computing devices have peripherals that can be detached when not in use. For example, certain tablet-style computing devices that ordinarily receive keystrokes via a touch-sensitive display may be configured such that a physical keyboard or touchpad can be attached to the computing device as an alternate input device. In some cases, such detachable peripherals include a microcontroller unit (MCU) to handle keyboard and touchpad events, as well as other functions. When the peripheral is attached to the computing device, the MCU in the peripheral has a physical data connection to the computing device. This data connection allows the computing device to control and monitor functions on the peripheral, such as keyboard backlight control, keyboard disable/enable control, and button-press event notification, while the peripheral is physically connected to the computing device. If the peripheral is physically disconnected from the computing device while the computing device is operational, the physical data connection is severed and the computing device can no longer control or monitor the peripheral. However, automatically and dynamically re-establishing control and monitoring functions after the physical data connection is re-established presents several non-trivial technical challenges.

DETAILED DESCRIPTION

Figure 1A:
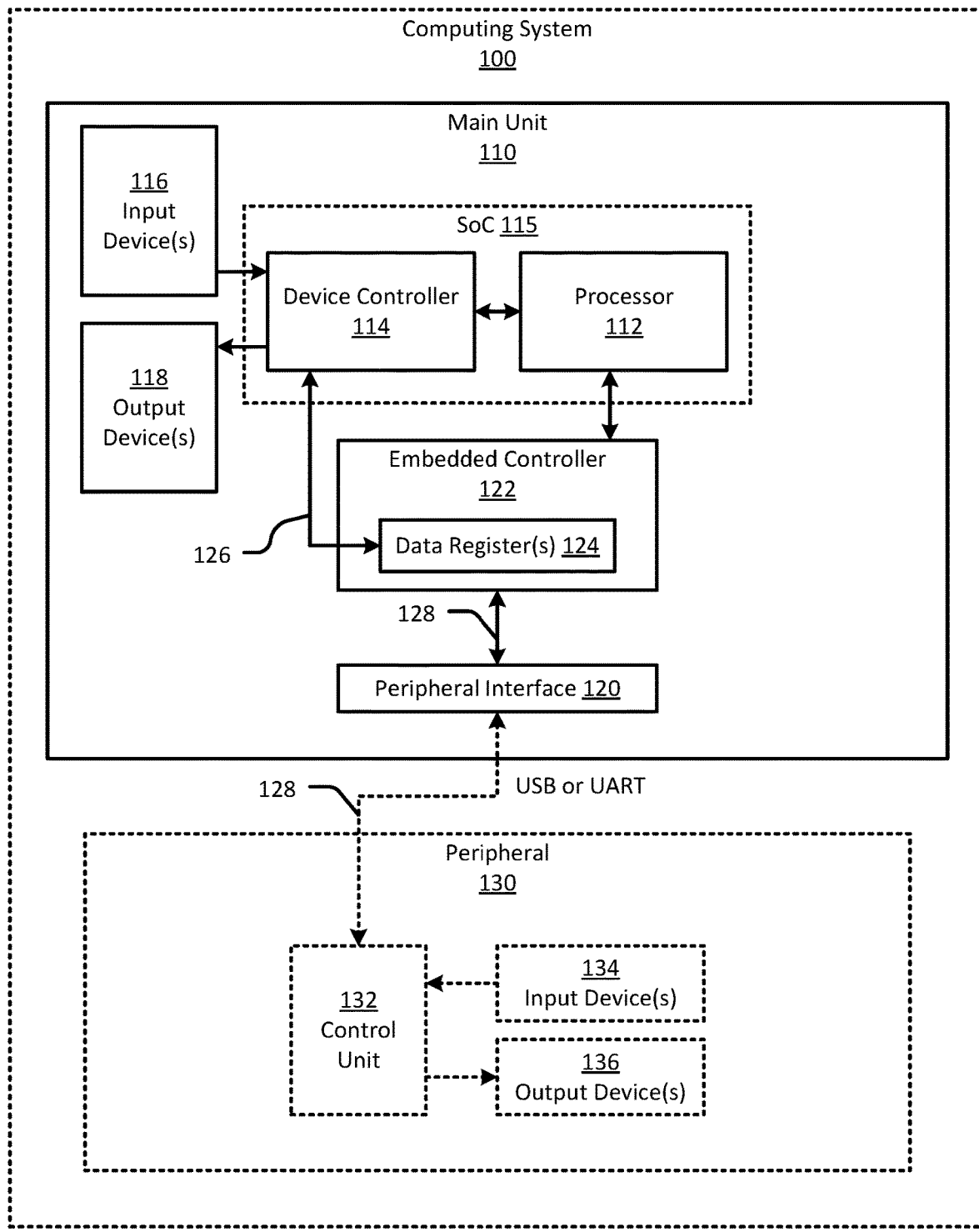
FIG. 1A illustrates an example computing system configured for a detachable peripheral, in accordance with an embodiment of the present disclosure.

Techniques are disclosed for enabling an integrated sensor hub (ISH) of a main computer to access input and output devices on a detachable peripheral device. The input/output devices can be dynamically connected and disconnected to the ISH at runtime in a hot plug-and-play manner. In accordance with an embodiment, the techniques can be implemented in a computing system that includes a main computing device having a peripheral interface, an embedded controller in electronic communication with the peripheral interface, and a device controller in electronic communication with the embedded controller. The peripheral interface is configured to be detachably coupled to one or more peripherals. A peripheral includes a control unit and at least one input/output device. The embedded controller of the main computing device is configured to be in further electronic communication with the control unit of the peripheral via the peripheral interface while the peripheral is physically attached to the peripheral interface. The embedded controller of the main computing device includes at least one data register, and in some embodiments, a set of data registers, configured to store data relating to the peripheral and to the corresponding input/output device(s). The device controller of the main computing device is configured to read data from the data register(s) of the embedded controller, write data to the data register(s) of the embedded controller, or both.

General Overview

A number of computing devices, such as laptops, tablets and smartphones, are designed to work with detachable peripherals. For example, tablets typically have touch-sensitive screens that can be used as the primary input device. When a user needs to enter text, a virtual keyboard may be displayed on the screen, which the user can touch to simulate keystrokes. As an alternative, detachable peripherals can be used to provide features such as a conventional keyboard, mouse, trackpad, and various sensors that are not necessarily present in the main computing device. In some cases, these peripherals can be physically attached to and detached from the main computing device at the user's convenience in a dynamic or so-called plug-and-play manner, which permits both connection and disconnection of the peripheral while the main computing device is powered on and operational. In some cases, however, the available peripheral interfaces do not support hot plug-and-play. For example, in some such cases, when the peripheral is physically disconnected from the main computing device, all functions associated with that peripheral are immediately disrupted due to the loss of data connectivity. In such instances, the loss of functionality resulting from disconnection of the peripheral causes the main computing device to enter a state where the main computing device ignores the functions associated with the peripheral indefinitely. In this state, the main computing device is not able to automatically recover the lost functions when the peripheral is reattached, or attached for the first time, thereby preventing the use of the peripheral until the functions are manually reactivated by the user (such as by conducting a reboot after the peripheral is physically connected to the computing device), which is likely inconvenient and undesirable from a user experience perspective. Potential solutions to such design challenges include, for example, bypassing the ISH, using extra general purpose input-output (GPIO) bus bandwidth, using the host processor of the computing device as a bridge between the ISH and controller of the peripheral, or a communication bus transaction timeout feature to detect for detach/attach events. However, each of these potential solutions has certain drawbacks, including, for example, relatively high design and manufacturing costs and complexity, relatively low reliability and power efficiency, and relatively slow performance, as compared to current consumer preferences.

To this end, and in accordance with an embodiment of the present disclosure, techniques are disclosed for enabling an integrated sensor hub (ISH) of a main computer to access input and output devices on a detachable peripheral device. The input/output devices can be dynamically connected and disconnected to the ISH at runtime in a hot plug-and-play manner. In an embodiment, the techniques are implemented in a computing system that includes a main computing device or system or other intelligent platform (herein after simply referred to as a main unit) having a peripheral interface, an embedded controller in electronic communication with the peripheral interface, and a device controller in electronic communication with the embedded controller. The main unit may include, for example, a desktop or laptop personal computer, or a tablet, smartphone or other mobile device, or a game console, to name a few example intelligent platforms that may be configured to interface with input and output devices of peripherals. The peripheral interface is configured to be detachably coupled to one or more peripherals. A peripheral may include, for example, a keyboard, a mouse, a trackpad, a biometric sensor (e.g., fingerprint sensor or iris sensor), an accelerometer, a gyrometer, a barometer, a camera, a microphone, a game controller, or any other input or output device that is designed to operate in conjunction with the main unit. The peripheral further includes a control unit. The embedded controller of the main unit is configured to be in further electronic communication with the control unit of the peripheral via the peripheral interface of the main unit while the peripheral is attached to the peripheral interface. In operation, the control unit of the peripheral effectively exposes peripheral-side input/output data to the embedded controller of the main unit through the peripheral interface (e.g., such as USB or UART interface). The embedded controller of the main unit will expose a second interface (e.g., I²C slave interface) to the ISH and work as an agent for the peripheral-side input/output devices.

In some embodiments, the embedded controller includes at least one data register, and in some embodiments, a set of data registers, configured to store data relating to the peripheral and to the corresponding input/output device(s) of the peripheral. The device controller of the main unit is configured to read data from, and write data to, the data register(s) of the embedded controller of the main unit. The data register(s) can, in some embodiments, include a connection status register, which the embedded controller of the main unit uses to indicate whether or not the peripheral is attached to the peripheral interface. In turn, the device controller of the main unit can use the connection status register to determine whether or not the main unit is in electronic communication with the peripheral. In addition, the device controller of the main unit can use one or more other data registers to transfer data (e.g., read and/or write data) between the main unit and the peripheral. Numerous variations and configurations will be apparent in light of this disclosure.

As used in this disclosure, the term "biometrics" refers to a measureable biological characteristic and a process for recognizing an individual possessing the biological characteristic. The biological characteristic is, in some cases, anatomical or physiological, including fingerprints, palm features (e.g., veins), face features, DNA, signatures, voice features, hand features (e.g., geometry), iris structure, retina features, and scent details, to name a few examples. Any such characteristics can be generally captured in the form of a biometric sample or data captured by a biometric sensor. The recognition process can include processing biometric data representing the biological characteristic to identify, and verify the identity of, an individual.

As used in this disclosure, the term "biometrics sensor" refers to a device configured to acquire the data needed for biometrics recognition and verification. Such devices may include, for example, fingerprint sensors, retina and iris sensors, cameras, microphones, and other such tools capable of collecting biometrics. For example, a fingerprint sensor may incorporate feature detection technologies such as optical fingerprint imaging, ultrasonic imaging, and capacitance imaging to capture details of a person's fingerprints. An iris recognition sensor may incorporate video camera technology with near infrared illumination to capture images of a person's iris structure. A face recognition sensor may incorporate high resolution video camera technology (e.g., pixel resolution, spatial resolution, spectral resolution, temporal resolution, and radiometric resolution) to capture high resolution images of a person's distinctive facial features. A voice recognition sensor may include a microphone and possibly one or more audio filters, to capture a person's speech patterns. In some embodiments, a combination of such sensors may be used, to further increase security. In some embodiments, a sensor includes a transducer configured to generate an electrical signal representing biometric data.

Example System

FIG. 1A illustrates an example computing system 100 configured for use and operation with a detachable peripheral, in accordance with an embodiment of the present disclosure. The system 100 may be implemented, for example, in a smartphone, tablet computer, mobile device, desktop device, laptop device, or any other suitable computing device. The system 100 generally includes a main unit 110 configured to be detachably coupled to at least one peripheral 130. The main unit 110 includes one or more processors 112 or processor cores, a device controller 114, one or more input devices 116, one or more output devices 118, a peripheral interface 120, and an embedded controller 122. The embedded controller 112 includes one or more data registers 124 (e.g., 4-, 8-, 16-, 32- or 64-bit registers). In some embodiments, the processor 112 and the device controller 114 reside on a common system-on-chip (SoC) component 115, while the embedded controller 112 is a separate component from the SoC 115, although it will be understood that other configurations of these components (such as separate SoC components for the processor 112 and the device controller 114), are within the scope of the disclosed embodiments.

In some embodiments, the computing system 100 includes the peripheral(s) 130. However, it will be understood that the peripheral(s) 130 are configured to be detachable from the main unit 110. Therefore, the peripheral(s) 130 are not necessarily included in, or excluded from, every configuration of the system 100. In other words, some embodiments include one or more of the peripheral(s) 130, which may be attached and detached from the main unit 110, while some embodiments do not include any peripheral(s) 130. The peripheral 130 includes a control unit 132, and at least one input device 134 and/or at least one output device 136. The control unit 132 is configured to provide a communications interface between the peripheral interface 120 of the main unit 110 and the input device(s) 134 and the output device(s) 136. The input device 134 may include, for example, a keyboard, mouse, trackpad, biometric sensor, accelerometer, gyrometer, barometer, hinge sensor (such as for a detachable, hinged keyboard peripheral), camera, light sensor, microphone, or other device capable of providing a signal or data. The output device 134 may include, for example, an audio speaker and/or a lamp or other indicator, such a backlight for a keyboard or lamps to indicate modes or statuses. The output device 134 may, in some cases, provide power and data connections for one or more components of the peripheral 130 or an external power-consuming device (not shown), such as a Universal Serial Bus (USB) connector.

Generally referring again to the main unit 110, the processor 112 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 112 includes dual-core processor(s), dual-core mobile processor(s), and so forth.

The device controller 114 includes circuitry and logic for interfacing portions of the computing system 100, such as interfacing the processor 112 with the input device(s) 116, the output device(s) 118, and the peripheral interface 120 via the embedded controller 122. In this way, the device controller 114 can be thought of as a so-called integrated sensor hub (ISH). For example, the device controller 114 may process signals and data transmitted between the processor 112 and the input device(s) 116 and output device(s) 118, as well as signals and data transmitted between the processor 112 and the input device(s) 134 and output device(s) 136 of an attached peripheral 130. The device controller 114, in some embodiments, further includes circuitry and logic for controlling and capturing biometric samples from the peripheral 130, where the input device 134 includes a biometrics sensor. Examples of fingerprint biometrics sensors include, but are not limited to, capacitive sensors (Fingerprint Card 1020 Family, Synaptics 5100 family), optical (OxiTechnology all families of sensors, Authentic), and ultrasonic (UltraScan and Sonavation all families of sensors). Any of these sensors can include a transducer configured to generate an electrical signal representing biometric data. The device controller 114 can operatively isolate the input device(s) 134 and the output device(s) 136 of the peripheral 130 from direct access by the processor 112. For example, the main unit 110 may include a common bus interface 126 coupled to the device controller 114 and the embedded controller 122 for communicating between the device controller 114 and the peripheral 130 via the embedded controller 122. Examples of such a common bus interface 126 include a serial peripheral interface (SPI) and an SPI controller (e.g., SSP6), I²C (inter-integrated circuit), universal asynchronous receiver/transmitter (UART), Mobile Industry Processor Interface (MIPI), or a general-purpose I/O (GPIO) bus.

The peripheral interface 120 is a hardware component configured to permit communication of signals and data between the embedded controller 122 and the control unit 132 of the peripheral 130 while the peripheral is physically attached to the main unit 110. The peripheral interface 120 may, for example, include a USB (Universal Serial Bus) interface, a UART (universal asynchronous receiver/transmitter) interface, or other suitable interface, as indicated at 128, for handling all communications between the main unit 110 and the detachable peripheral 130. No extra I/O pins are needed for the device controller 114 to access sensors or other components of the peripheral 130. In some embodiments, the peripheral interface 120 is configured to provide fast data transfers of up to approximately 10 gigabits per second (e.g., USB 3.1) between the main unit 110 and the peripheral 130 when attached together. In some embodiments, there is no direct electronic line between the peripheral interface 120 and the processor 112 in the main unit 110. In some such embodiments, however, there can be a direct electronic line between the processor 112 and the input device(s) 116 and the output device(s) 118 via the device controller 114, bypassing the embedded controller 122.

Figure 1B:
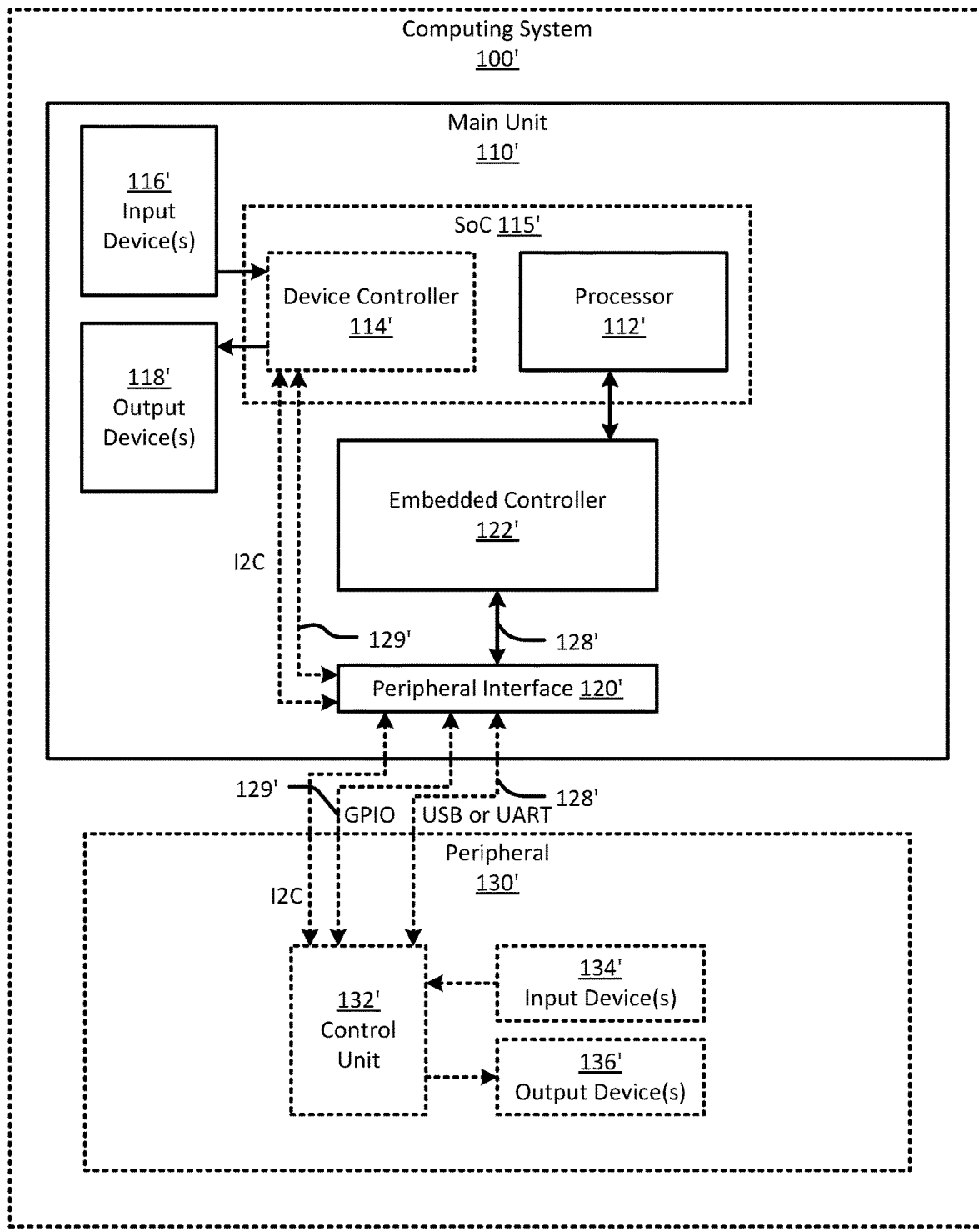
FIG. 1B illustrates another computing system configured for a detachable peripheral, for comparative purposes.

The example system 100 of FIG. 1A can be contrasted to another possible solution shown in FIG. 1B, which illustrates example computing system 100' configured for a detachable peripheral. The system 100' of FIG. 1B is similar to the system 100 of FIG. 1A, except the system 100' does not include the data registers 124 described herein. The system 100' may include a device controller, such as the device controller (ISH) 114' as part of a SoC 115' with a processor 112', but the device controller 114' is not necessarily included in all such embodiments. Instead, the input device(s) 134' and output device(s) 134' of the peripheral 130 are directly interfaced with the processor 112' via the embedded controller 122'. Furthermore, in addition to the standard interface (e.g., USB or UART) 128', extra general purpose I/O (GPIO) pins 129' are used to notify the device controller 114 when the peripheral 130' is attached to or detached from the peripheral interface 120'. Further, dedicated I²C bus lines can be used to connect the sensors, inputs and outputs 134', 136' to the device controller (ISH) 114'. In this embodiment, the embedded controller 122' and/or the device controller 114' cannot access the sensors or other components of the detachable peripheral 130' without adding the extra GPIO pins 129'. By contrast, as noted above, extra input/output pins are not needed for accessing the peripheral 130 in the embodiment of FIG. 1A. In some cases, the input device(s) 116' and output device(s) 118' of the main unit 110' in FIG. 1B are directly interfaced with the processor 112'. In the configuration of the system 100', the benefits and advantages of the functionality provided by the device controller 114 and the data registers 124 of FIG. 1A are not necessarily provided.

An advantage and benefit of the configuration of the system 100 is that the device controller 114 can be co-located with the processor 112 on the same SoC, which has a seamless connection between any other components that may be integrated into the SoC, such as camera and audio components, which can facilitate advanced functionality, such as audio classification. Another advantage and benefit of the configuration of the system 100 is that the control unit 132 of the peripheral 130 need not be modified to interoperate with the main unit 110, since the interface between the peripheral 130 and the embedded controller 122 need not be changed.

Example Data Register(s)

Figure 2:
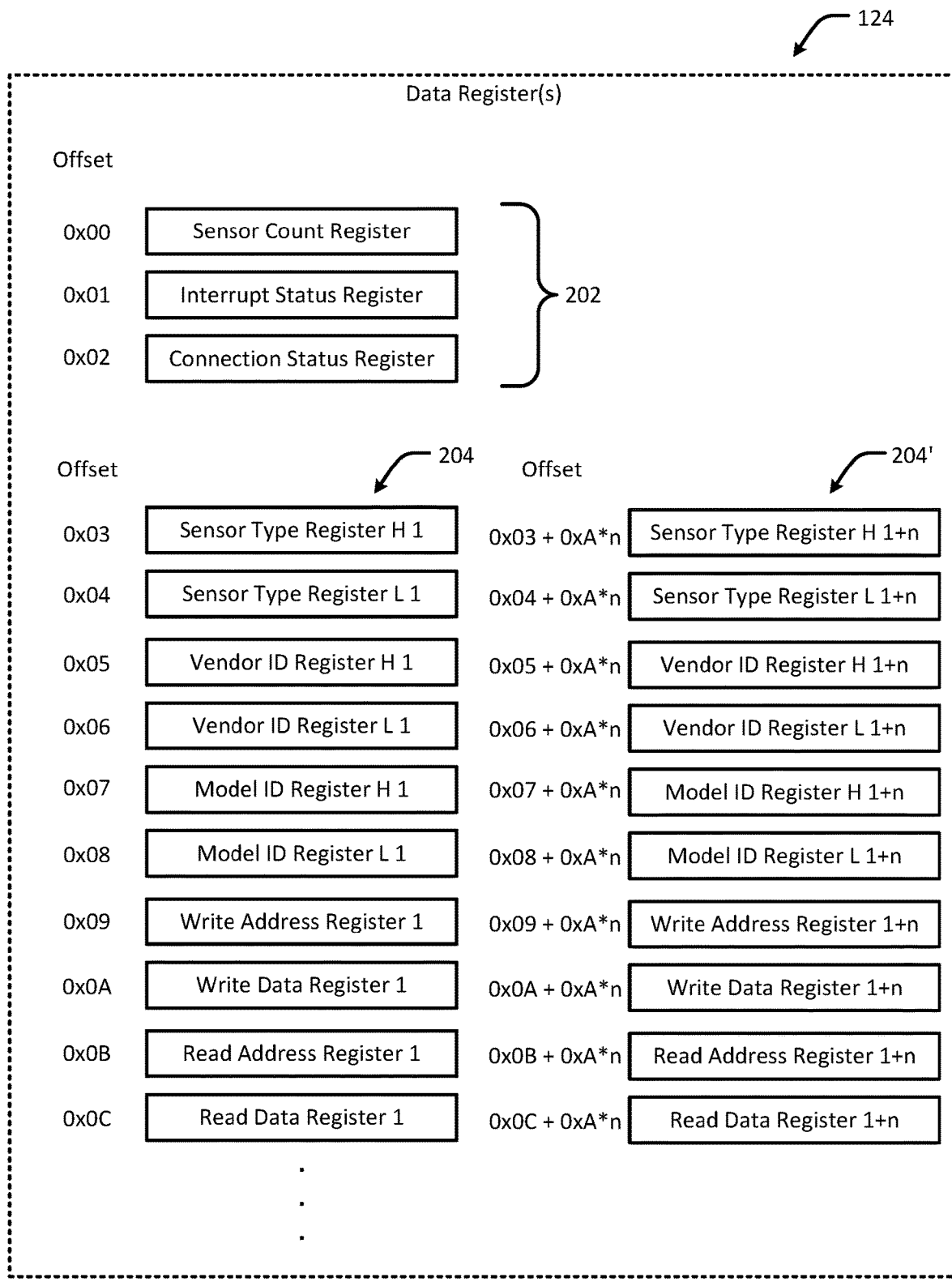
FIG. 2 illustrates an example of data register(s) used in the example system of FIG. 1A, in accordance with an embodiment of the present disclosure.

FIG. 2 illustrates an example of the data register(s) 124 of the embedded controller 122 of FIG. 1, in accordance with an embodiment of the present disclosure. The data register(s) 124 can include one or more of the following: general purpose registers 202 and peripheral access registers 204, 204'. The general purpose registers 202 can include a sensor count register, an interrupt status register, and a connection status register. Each of the registers 202 can be addressed by the device controller 114 at a base address plus an offset address, such as shown in the example of FIG. 2. The sensor count register can be configured to provide, to the device controller 114, the number of inputs 134 and outputs 136 present in the peripheral 130, when the peripheral 130 is attached to the main unit 110. Each of these inputs and outputs can be either connected or disconnected, depending on whether or not the peripheral 130 is attached to the main unit 110. The interrupt status register can be configured to indicate to the device controller 114 whether a particular input or output has triggered an interrupt. The interrupt status register may, for example, be a bitmap where bit X of the register refers to input/output X in the peripheral 130. The interrupt status register may be used, for example, when the input/output in the peripheral 130 supports an interrupt working mode. The connection status register can be configured to indicate to the device controller 114 whether a particular input/output in the peripheral 130 is currently connected or disconnected. When embedded controller 122 may receive, for example, a peripheral attach/detach event through the peripheral interface 120, the bits in the connection status register are updated to correspond to the inputs/outputs in the peripheral 130.

In accordance with an embodiment, the data registers 124 include a set of data registers 204, 204' for each input/output device in the peripheral 130. The number and type of the data registers 204, 204' can be dependent on the corresponding number of input/output devices provided by the peripheral 130 to the main unit 110. Each of the registers 204, 204' can be addressed by the device controller 114 at a base address plus an offset address, such as shown in the example of FIG. 2. For example, for a given input/output device in the peripheral 130, there may be up to ten data registers as shown in FIG. 2. As used herein, the term "sensor" refers to any type of input or output device, including but not limited to sensor-type devices. A Sensor Type Register X provides the device controller 114 with a type identification (ID) of sensor no. X, such as 0x73 for an accelerometer and 0x76 for a gyrometer. The Sensor Type ID may, for example, be 16 bits, with 8 bits the high register (H) and 8 bits in the low register (L). Similarly, a Vendor ID Register X provides the device controller 114 with an ID of the vendor for Sensor No. X using a 16 bit vendor ID. Similarly, a Model ID Register X provides the device controller 114 with an ID of Sensor No. X using a 16 bit vendor/model ID. The vendor/model ID may, for example, be vendor specific. Similarly, a Write Address Register X/Read Address Register X provides the device controller 114 with a target address of a target register on Sensor No. X for read/write access. Similarly, a Write Data Register X/Read Data Register X provides the device controller 114 write/read data to/from the target register on Sensor No. X, as specified by the corresponding Write Address Register X/Read Address Register X, described above. Other examples will be apparent in light of the present disclosure.

Example Methodology

Figure 3:
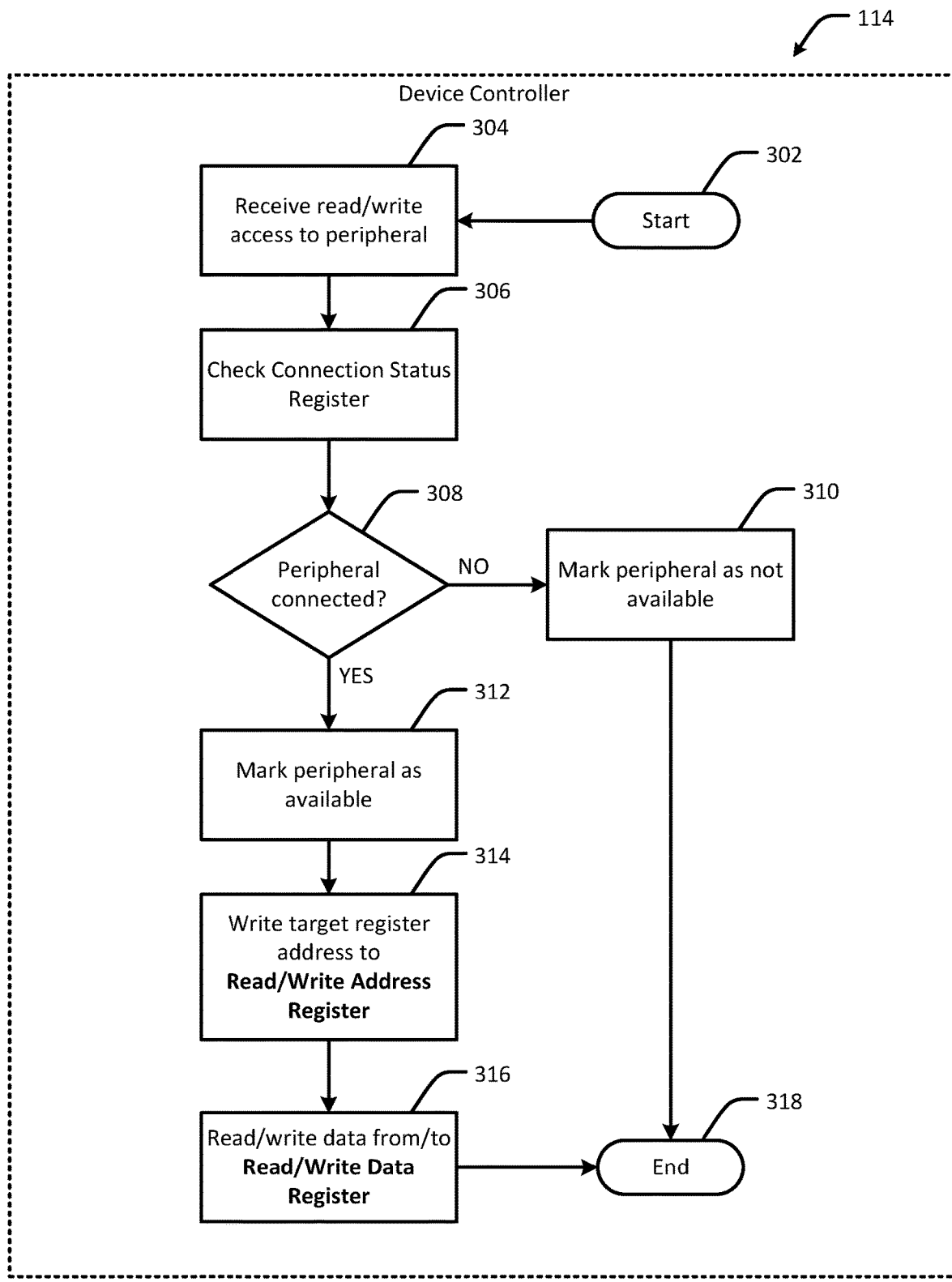
FIG. 3 is a flow diagram of an example methodology for operating a computer with a detachable peripheral, in accordance with an embodiment of the present disclosure.

FIG. 3 is a flow diagram of an example methodology for operating a computer with a detachable peripheral, in accordance with an embodiment of the present disclosure. In some embodiments, the methodology can be implemented by the device controller 114 of FIG. 1, although it will be appreciated that in some other embodiments, all or portions of the methodology may be implemented by other components of the system 100 of FIG. 1, such as the embedded controller 122 and the processor 112, as will be apparent in light of the present disclosure. Furthermore, performance of any aspect of the disclosed methodology can occur in different sequences than those expressly described in this example embodiment, or omitted entirely. Accordingly, the example flow diagram of FIG. 3 only provides a general overview of one example methodology, and does not limit the scope of various other embodiments.

The methodology begins at 302. A request to read from or write to a peripheral, such as the peripheral 130 of FIG. 1, is received at 304. The request may be sent by a processor, such as the processor 112 of FIG. 1, as needed by an application executing on the processor. A connection status register, such as described with respect to FIG. 2, is checked at 306 to determine whether the peripheral, or any particular input/output device in the peripheral, is connected and therefore available to service the read or write request. If the peripheral is not connected at 308, the peripheral is marked as not available in an internal storage register (e.g., by setting a bit) at 310, and the methodology ends at 318. By marking the peripheral as not available, all algorithms executing on the processor that request access to the peripheral can be stopped from depending on the peripheral for further execution (e.g., the algorithms may stop processing the corresponding read and write requests). If, however, the peripheral is connected at 308, the peripheral is marked as available at 312. By marking the peripheral as available, all algorithms executing on the processor that request access to the peripheral can resume dependencies on the peripheral (e.g., the algorithms may resume processing the corresponding read and write requests). A target register address corresponding to a particular input/output device in the peripheral is stored in a read/write address register, such as described with respect to FIG. 2, at 314. Data associated with the read/write access request is read from or written to a read/write data register, such as described with respect to FIG. 2, at 316. The data in the read/write data register can be transferred between the device controller 114 and the peripheral 130 via the embedded controller 112 and the peripheral interface 120, such as described with respect to FIG. 1. The methodology ends at 318. All or portions of the methodology described above can be repeated any number of times, for example, as a looping process or when triggered by an interrupt event generated by the processor.

Additional Examples

Figure 4:
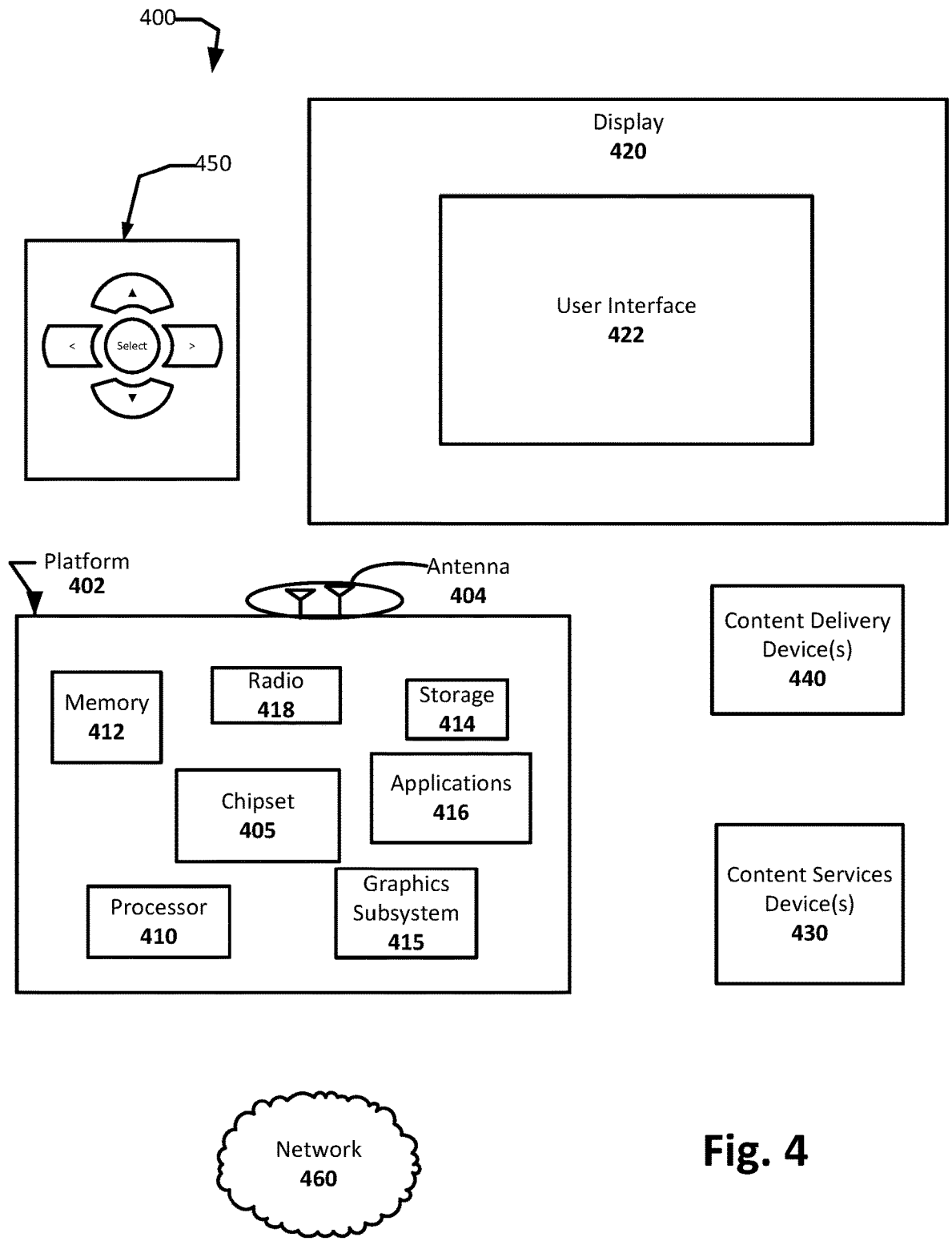
FIG. 4 illustrates a media system configured in accordance with an embodiment of the present disclosure.

FIG. 4 illustrates an example system 400 that may carry out techniques disclosed herein, in accordance with an embodiment of the present disclosure. For example, all or portions of the example system 100 and methodology of FIGS. 1-3 may be implemented by the system 400. In some embodiments, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, set-top box, game console, or other such computing environments capable of performing graphics rendering operations.

In some embodiments, system 400 includes a platform 402 coupled to a display 420. Platform 402 may receive content from a content device such as content services device(s) 430 or content delivery device(s) 440 or other similar content sources. A navigation controller 450 comprising one or more navigation features may be used to interact with, for example, platform 402 and/or display 420. Each of these example components is described in more detail below.

In some embodiments, platform 402 includes any combination of a chipset 405, processor 410, memory 412, storage 414, graphics subsystem 415, applications 416 and/or radio 418. Chipset 405 provides intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 410 includes dual-core processor(s), dual-core mobile processor(s), and so forth. Memory 412 may be implemented, for instance, as a volatile memory device such as, but not limited to, a Random Access Memory (RAM), Dynamic Random Access Memory (DRAM), or Static RAM (SRAM). Storage 414 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 414 includes technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 can be integrated into processor 410 or chipset 405. Graphics subsystem 415 can be a stand-alone card communicatively coupled to chipset 405. The graphics and/or video processing techniques described herein may be implemented in various hardware architectures. For example, hardware assisted privilege access violation check functionality as provided herein may be integrated within a graphics and/or video chipset. Alternatively, a discrete security processor may be used. In still another embodiment, the graphics and/or video functions including hardware assist for privilege access violation checks may be implemented by a general purpose processor, including a multi-core processor.

Radio 418 can include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In some embodiments, display 420 includes any television or computer type monitor or display. Display 420 may comprise, for example, a liquid crystal display (LCD) screen, electrophoretic display (EPD or liquid paper display, flat panel display, touch screen display, television-like device, and/or a television. Display 420 can be digital and/or analog. In some embodiments, display 420 is a holographic or three-dimensional display. Also, display 420 can be a transparent surface that may receive a visual projection. Such projections may convey various forms of information, images, and/or objects. For example, such projections may be a visual overlay for a mobile augmented reality (MAR) application. Under the control of one or more software applications 416, platform 402 can display a user interface 422 on display 420.

In some embodiments, content services device(s) 430 can be hosted by any national, international and/or independent service and thus accessible to platform 402 via the Internet or other network, for example. Content services device(s) 430 can be coupled to platform 402 and/or to display 420. Platform 402 and/or content services device(s) 430 can be coupled to a network 460 to communicate (e.g., send and/or receive) media information to and from network 460. Content delivery device(s) 440 can be coupled to platform 402 and/or to display 420. In some embodiments, content services device(s) 430 includes a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, graphics, text, medical and gaming content, and so forth.

Content services device(s) 430 receives content such as cable television programming including media information, digital information, and/or other content. Examples of content providers may include any cable or satellite television or radio or Internet content providers. The provided examples are not intended to limit the scope of the present disclosure. In some embodiments, platform 402 receives control signals from navigation controller 450 having one or more navigation features. The navigation features of controller 450 may be used to interact with user interface 422, for example. In some embodiments, navigation controller 450 can be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 can be echoed on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422. In some embodiments, controller 450 is not a separate component but rather is integrated into platform 402 and/or display 420.

In some embodiments, drivers (not shown) include technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 when the platform is turned "off." In addition, chip set 405 may comprise hardware and/or software support for 5.1 surround sound audio and/or high definition 7.1 surround sound audio, for example. Drivers may include a graphics driver for integrated graphics platforms. In some embodiments, the graphics driver includes a peripheral component interconnect (PCI) express graphics card.

In various embodiments, any one or more of the components shown in system 400 can be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the scope of the present disclosure.

In various embodiments, system 400 can be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 can include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media include a wire, cable, metal leads, printed circuit board (PCB), backplane, switch fabric, semiconductor material, twisted-pair wire, co-axial cable, fiber optics, and so forth.

Platform 402 can establish one or more logical or physical channels to communicate information. The information may include media information and control information. Media information refers to any data representing content meant for consumption by a user. Examples of content include, for example, data from a voice conversation, videoconference, streaming video, email or text messages, voice mail message, alphanumeric symbols, graphics, image, video, text and so forth. Control information refers to any data representing commands, instructions or control words meant for used by an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 4.

As previously described, examples of a mobile computing device include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments are described with a mobile computing device implemented as a smart phone, it will be appreciated that other embodiments may be implemented using other wireless mobile computing devices as well.

Various embodiments can be implemented using hardware elements, software elements, or a combination of both. Examples of hardware elements includes processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Unless specifically stated otherwise, it will be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays.

Further Example Embodiments

The following examples pertain to further embodiments, from which numerous permutations and configurations will be apparent.

Example 1 is a system for accessing input/output devices of a detachable peripheral. The system includes a peripheral interface configured to be attachable to and detachable from a peripheral having a control unit and at least one input/output device; an embedded controller communicatively coupled with the peripheral interface, the embedded controller configured to communicate with the control unit of the peripheral via the peripheral interface while the peripheral is attached to the peripheral interface, the embedded controller including at least one data register configured to store data relating to the peripheral; and a device controller configured to read data from the at least one data register of the embedded controller and/or write data to the at least one data register of the embedded controller.

Example 2 includes the subject matter of Example 1, where the embedded controller is further configured to transfer data between the at least one data register and the control unit of the peripheral while the peripheral is attached to the peripheral interface.

Example 3 includes the subject matter of any of Examples 1 and 2, where the at least one data register of the embedded controller is a connection status register, and where the embedded controller is further configured to set a bit in the connection status register in response to determining that the peripheral have been attached to the peripheral interface or detached from the peripheral interface.

Example 4 includes the subject matter of Example 3, where the device controller is further configured to check the bit in the connection status register to determine whether the peripheral is attached to the peripheral interface prior to reading data from the at least one data register and writing data to the at least one data register.

Example 5 includes the subject matter of any of Examples 1-4, where the at least one data register of the embedded controller includes a write address register and a read address register, and where the device controller is further configured to store a target address in at least one of the write address register and the read address register, the target address corresponding to the at least one input/output device of the peripheral.

Example 6 includes the subject matter of Example 5, where the at least one data register of the embedded controller includes a write data register and a read data register, each of the write data register and the read data register configured to store data relating to the at least one input/output device of the peripheral corresponding to the target address stored in the write address register and the read address register, respectively.

Example 7 includes the subject matter of any of Examples 1-6, further including a processor communicatively coupled with the embedded controller.

Example 8 includes the subject matter of Example 7, further including a system-on-chip (SoC) component including the processor and the device controller.

Example 9 includes the subject matter of Example 8, where the embedded controller is separate from the SoC component.

Example 10 includes the subject matter of any Examples 1-9, where the system includes the peripheral.

Example 11 includes the subject matter of any of Examples 1-10, where the peripheral interface includes at least one of a Universal Serial Bus (USB) interface and a universal asynchronous receiver/transmitter (UART) interface.

Example 12 includes the subject matter of any of Examples 1-11, further including a second interface between the device controller and the embedded controller and for passing communications between the device controller and the peripheral as directed by the embedded controller.

Example 13 includes the subject matter of Example 12, where the second interface is an I2C (inter-integrated circuit) communicatively coupled to the device controller and the embedded controller.

Example 14 is a method of accessing input/output devices of a detachable peripheral. The method includes receiving a request to read data from at least one input/output device of the detachable peripheral or to write data to the at least one input/output device of the detachable peripheral; checking a bit in a connection status register to determine whether the peripheral is attached to a peripheral interface of the computing system; storing a target address to at least one of a write address register and a read address register, the target address corresponding to the at least one input/output device of the detachable peripheral; and reading data from a read data register or writing data to a write data register; where the read data register and the write data register are included in an embedded controller of the computing system, and where the embedded controller is configured to communicate with the detachable peripheral via the peripheral interface while the detachable peripheral is attached to the peripheral interface.

Example 15 includes the subject matter of Example 14, further including transferring data between the detachable peripheral and at least one of the read data register and the write data register while the detachable peripheral is attached to the peripheral interface.

Example 16 includes the subject matter of any of Examples 14 and 15, further including updating the bit in the connection status register in response to determining that the detachable peripheral has been attached to the peripheral interface or detached from the peripheral interface.

Example 17 includes the subject matter of any of Examples 14-16, further including marking the detachable peripheral as one of available and not available based on the bit in the connection status register.

Example 18 includes the subject matter of Example 17, where reading data from the read data register and writing data to the write data register occurs in response to marking the detachable peripheral as available.

Example 19 is a computer program product including one or more non-transitory machine readable mediums having instructions encoded thereon that when executed by one or more processors cause a process to be carried out. The process includes receiving a request to read data from a detachable peripheral or to write data to the detachable peripheral; checking a bit in a connection status register to determine whether the detachable peripheral is attached to a peripheral interface of a computing system; storing a target address to at least one of a write address register and a read address register, the target address corresponding to the detachable peripheral; and reading data from a read data register or writing data to a write data register; where the read data register and the write data register are included in an embedded controller of the computing system, and where the embedded controller is configured to communicate with the detachable peripheral via the peripheral interface while the detachable peripheral is attached to the peripheral interface.

Example 20 includes the subject matter of Example 19, where the process further includes transferring data between the detachable peripheral and at least one of the read data register and the write data register while the detachable peripheral is attached to the peripheral interface.

Example 21 includes the subject matter of any of Examples 19 and 20, where the process further includes updating the bit in the connection status register in response to determining that the detachable peripheral has been attached to the peripheral interface or detached from the peripheral interface.

Example 22 includes the subject matter of any of Examples 19-21, where the process further includes marking the detachable peripheral as one of available and not available based on the bit in the connection status register.

Example 23 includes the subject matter of Example 22, where the reading data from the read data register and the writing data to the write data register occurs in response to marking the detachable peripheral as available.

The foregoing description of example embodiments has been presented for the purposes of illustration and description. This description is not intended to be exhaustive or to limit the present disclosure to the precise forms disclosed. Many modifications and variations are possible in light of this disclosure. This disclosure does not intend to limit the scope of the various embodiments. Future filed applications claiming priority to this application may claim the disclosed subject matter in a different manner, and may generally include any set of one or more limitations as variously disclosed or otherwise demonstrated herein.

What is claimed is:

1. A system for accessing input/output devices of a detachable peripheral, the system comprising:
   a peripheral interface configured to be attachable to and detachable from a peripheral having a control unit and at least one input/output device;
   an embedded controller communicatively coupled with the peripheral interface, the embedded controller configured to communicate with the control unit of the peripheral via the peripheral interface while the peripheral is attached to the peripheral interface, the embedded controller comprising at least one data register configured to store data relating to the peripheral; and
   a device controller configured to one or both of:
      read data from the at least one data register of the embedded controller, and
      write data to the at least one data register of the embedded controller,
   wherein the at least one data register of the embedded controller includes a write address register and a read address register, and wherein the device controller is further configured to store a target address in one or both of the write register and the read address register, the target address corresponding to the at least one input/output device of the peripheral.

2. The system of claim 1, wherein the embedded controller is further configured to transfer data between the at least one data register and the control unit of the peripheral while the peripheral is attached to the peripheral interface.

3. The system of claim 1, wherein the at least one data register of the embedded controller includes a connection status register, and wherein the embedded controller is further configured to set a bit in the connection status register in response to determining that the peripheral has been one of: attached to the peripheral interface, or detached from the peripheral interface.

4. The system of claim 3, wherein prior to reading data from the at least one data register and writing data to the at least one data register, the device controller is further configured to check the bit in the connection status register to determine whether the peripheral is attached to the peripheral interface.

5. The system of claim 1, wherein the at least one data register of the embedded controller includes a write data register and a read data register, each of the write data register and the read data register configured to store data relating to the at least one input/output device of the peripheral corresponding to the target address stored in the write address register and the read address register, respectively.

6. The system of claim 1, further comprising a processor communicatively coupled with the embedded controller.

7. The system of claim 6, further comprising a system-on-chip (SoC) component including the processor and the device controller.

8. The system of claim 7, wherein the embedded controller is separate from the SoC component.

9. The system of claim 1, wherein the system includes the peripheral.

10. The system of claim 1, wherein the peripheral interface includes one or both of a Universal Serial Bus (USB) interface and a universal asynchronous receiver/transmitter (UART) interface.

11. The system of claim 1, further comprising a second interface between the device controller and the embedded controller and for passing communications between the device controller and the peripheral as directed by the embedded controller.

12. The system of claim 11, wherein the second interface is an I2C (inter-integrated circuit) communicatively coupled to the device controller and the embedded controller.

13. A method of accessing input/output devices of a detachable peripheral, the method comprising:
   receiving a request to one of: read data from at least one input/output device of the detachable peripheral, or write data to the at least one input/output device of the detachable peripheral;
   checking a bit in a connection status register to determine whether the peripheral is attached to a peripheral interface of the computing system;
   storing a target address to one or both of a write address register and a read address register, the target address corresponding to the at least one input/output device of the detachable peripheral;
   one or both of:
      reading data from a read data register; and
      writing data to a write data register;
      wherein the read data register and the write data register are included in an embedded controller of the computing system, and wherein the embedded controller is configured to communicate with the detachable peripheral via the peripheral interface while the detachable peripheral is attached to the peripheral interface;
   transferring data between the detachable peripheral and one or both of the read data register and the write data register while the detachable peripheral is attached to the peripheral interface;
   updating the bit in the connection status register in response to determining that the detachable peripheral has been one of: attached to the peripheral interface, or detached from the peripheral interface; and
   making the detachment peripheral as one of available or not available base on the bit in the connection status register, wherein reading data from the read data register and writing data to the write data register occurs in response to marking the detachment peripheral as available.

14. A computer program product including one or more non-transitory machine readable mediums having instructions encoded thereon that when executed by one or more processors cause a process to be carried out for accessing input/output devices of a detachable peripheral, the process comprising:

receiving a request to one of: read data from a detachable peripheral, or write data to the detachable peripheral;

checking a bit in a connection status register to determine whether the detachable peripheral is attached to a peripheral interface of a computing system;

storing a target address to one or both of a write address register and a read address register, the target address corresponding to the detachable peripheral;

one or both of:

reading data from a read data register; and writing data to a write data register;

wherein the read data register and the write data register are included in an embedded controller of the computing system, and wherein the embedded controller is configured to communicate with the detachable peripheral via the peripheral interface while the detachable peripheral is attached to the peripheral interface; and marking the detachable peripheral as one of available or not available based on the bit in the connection status register, wherein reading data from the read data register and the writing data to the write data register occurs in response to marking the detachable peripheral as available.

15. The computer program product of claim 14, wherein the process further comprises transferring data between the detachable peripheral and one or both of the read data register and the write data register while the detachable peripheral is attached to the peripheral interface.

16. The computer program product of claim 14, wherein the process further comprises updating the bit in the connection status register in response to determining that the detachable peripheral has been one of: attached to the peripheral interface, or detached from the peripheral interface.

\* \* \* \* \*